United States Patent [19]

Sander

[11] Patent Number: 4,942,043

[45] Date of Patent: Jul. 17, 1990

[54] SUNFLOWER BASED WILD BIRD FEED

[75] Inventor: Eugene H. Sander, Hayfield, Minn.

[73] Assignee: Muscatine Gene's, Inc., Hayfield, Minn.

[21] Appl. No.: 284,325

[22] Filed: Dec. 14, 1988

Related U.S. Application Data

[63] Continuation-in-part of Ser. No. 126,744, Jan. 13, 1988, abandoned.

[51] Int. Cl.$^5$ .............................................. A23K 1/00
[52] U.S. Cl. .......................................... 426/2; 426/93; 426/303; 426/309; 426/541; 426/623; 426/630; 426/807
[58] Field of Search ............... 426/293, 302, 303, 309, 426/310, 630, 541, 623, 807

[56] References Cited

U.S. PATENT DOCUMENTS

| | | | |
|---|---|---|---|
| 2,813,795 | 11/1957 | Hale | 99/23 |
| 4,356,793 | 11/1982 | Blasbalg | 119/51 |
| 4,595,596 | 6/1986 | Fazzolare et al. | 426/629 |

OTHER PUBLICATIONS

Geis et al., "Wild Bird Feeding Preferences", National Wildlife Federation Bulletin T2CD85 (1985), pp. 1–4.

*Primary Examiner*—R. B. Penland
*Attorney, Agent, or Firm*—Kinney & Lange

[57] ABSTRACT

A wild bird feed includes a sunflower heart of chip coated with a hydrophobic coating that includes a corn gluten meal. Additionally, a lipid such as beef tallow is added to the coating. A preferred coating additionally includes glycerin. The invention also includes a process for producing such a feed.

10 Claims, No Drawings

SUNFLOWER BASED WILD BIRD FEED

The present application is a continuation-in-part application Ser. No. 126,744, filed Jan. 13, 1988 abandoned.

BACKGROUND OF THE INVENTION

1. Field of the Invention.

The present invention relates generally to the feeding of wild birds. More particularly, the invention relates to a substitute for Niger/Thistle seed wild bird food which includes a sunflower seed portion, a color coat, and a hydrophobic top coat produced from gluten meal and beef tallow. The invention also discloses a process to produce this product.

2. Description of the Prior Art.

The attraction of wild song birds to residential areas through feeding is a well-known practice. Tobin U.S. Pat. No. 4,246,869 discloses feeding Niger/Thistle seed or crushed sunflower seeds to small birds such as finches, siskins, red polls, and chicadees. The National Wildlife Federation, in Bulletin TZCD85, rates hulled sunflower 10 compared to a rating of 6 for Niger/Thistle seed, on a scale of 0–10, with 10 reflecting excellent acceptance by Goldfinches.

Most Niger/Thistle seed used for wild bird food in the United States is imported. This seed has a natural protective coating, but remains subject to insect infestation and contamination with foregin noxious weeds. Currently, the U.S.D.A. requires that all imported Niger/Thistle seed be heat treated to prevent germination of noxious weed seed. Unfortunately, such heat treatment of the Niger/Thistle seed tends to render it unpalatable to certain species of wild birds, especially finches.

Sunflower hearts, as currently supplied for wild bird feed, also have some well-known problems. These problems include insect infestation, moisture pickup, mold and chemical spoilage. Fazzolare U.S. Pat. No. 4,595,596 et al discloses coating sunflower seeds with zein and acetylated monoglycerides for use in baking. Alternative coatings include waxes, shellacs and resins. Other methods to improve stability of sunflower seeds in biscuits and crackers have included the use of antioxidants such as citric acid, butylated hydroxyanisole (BHA) and butylated hydroxytoluene (BHT). Fazzolare U.S. Pat. No. 4,761,296 discloses impregnating sunflower seeds with high stability vegetable oil to improve shelf life.

The prior art concerned with the exterior color of nuts, seeds and their substitutes includes several methods to change their appearance to the human eye. Some of these methods are concerned with attractive appearance to the human consumer. Sharma U.S. Pat. No. 4,522,833 discloses honey coated nuts. Durst U.S. Pat. No. 3,872,229 discloses artificial nuts coated with zein, wax, shellac or mono- and di-glycerides. Durst discloses the use of an edible color sprayed on an intermediate product of the artificial nuts to simulate a nut skin.

Other exterior color coating methods are concerned with facilitating identification of treated seeds to humans. Barke et al U.S. Pat. No. 4,368,591 discloses coating seeds with $TiO_2$ and a yellow dye. The coatings help humans identify seeds that have been treated in various ways. For example, seeds treated with bird repellent could be readily identified by the altered colorings. Similarly, Porter et al U.S. Pat. No. 4,394,845 discloses a toluol based "blue plant paint" which aided in identifying coated seeds.

U.S. Pat. Nos. 3,032,422 and 2,792,509 disclose a nutritive food glaze based on zein.

U.S. Pat. No. 3,062,660 discloses treating raw nut meats with a zein coating.

SUMMARY OF THE INVENTION

The present invention is a substitute for a Niger/Thistle seed wild bird food. The substitute includes a sunflower heart or chip coated with a hydrophobic coat including a corn gluten meal. Preferably, the coating includes a lipid and an anti-oxidant.

Additionally, the present invention includes a surprisingly simple and effective process for preparing the Niger/Thistle seed substitute.

DETAILED DESCRIPTION OF THE PREFERRED EMBODIMENTS

The present invention provides an alternative product to imported Niger/Thistle seed. The substitute product has a sunflower heart or chip and a protective or hydrophobic top coat. Surprisingly, the preferred embodiment is more attractive to wild birds than either uncoated sunflowers or Niger/Thistle seeds. The substitute product is also more stable than uncoated sunflower seeds.

Sunflower hearts or chips are readily available as a domestic biproduct of agriculture. Specifically, they are a biproduct of the sunflower dehulling process. Sunflower seed portions less than 8-mesh (U.S. standard sieve size) are appropriate for this invention. This sieve portion is called a "heart" in the trade. Particularly preferred in the present invention are sunflower hearts or chips which pass an 8-mesh screen. This particle size (called a "chip" in the trade), less than 8-mesh, closely approximates the maximum size which would be accessible to birds through the opening in current commercially available tube-type feeders. Sunflower hearts or chips which pass an 8-mesh screen are readily available and closely approximate the size of the Niger/Thistle seeds which the product seeks to replace. Additionally, this size can be easily consumed by small songbirds which typically feed on Niger/Thistle seed.

In a preferred embodiment, the hearts and chips are made more uniform in size by eliminating material which will pass through a 20-mesh screen (U.S. standard sieve size). Additionally, portions passing through a 10-mesh screen appear remarkably similar in size to Niger/Thistle seed.

Part of the subject invention is a hydrophobic top coat containing corn gluten meal granules. Three types of top coats were tested: first, an edible shellac product; second and third, zein based coatings made by two different processes—a) a solution made by resolubilizing commercially available refined zein, and b) a corn meal gluten/alcohol slurry. A desirable feature in the top coat is the ability to protect freshness of the coated sunflower seed hearts or chips in 70–100 percent relative humidity experimental chambers. In general, the zein type coats were more effective than edible shellac type coats drying without tackiness and having greater appeal to birds.

Use of the zein coating product in (b.) is not known to the prior art and had distinct advantages over that of (a.). Preparation of the coating is simple, consisting of solubilizing and using the zein from corn gluten meal without separating it from residual ethanol insoluble material. Other lipid components and/or stabilizers are added to the gluten meal/alcohol slurry. The solubilized zein has the ability to bind the residual gluten granules to the sunflower seed chips such that they are not observed in the finished product.

The use of the gluten/alcohol slurry has significant cost advantages over the use of resolubilized refined zein, and also unexpectedly shows greater adherent properties over the refined zein coatings. Moreover, the discovered coating avoids the tendency of refined zein to form opaque films under some conditions. These improvements in the film forming ability of the zein may be the result of a more native protein structure in the invented process when compared to resolubilizing refined zein which has undergone an additional drying step.

The corn gluten coating of this invention was made even more effective in terms of moisture resistance and attractiveness to birds by the addition of lipids. Various lipids were tested including triglycerides, acetylated mono- and di-glycerides, polysorbate 80 (Tween 80), mono- and di-glycerides, waxes and tallow. Additionally, combinations of lipids were tested. A combination of hydrogenated vegetable oil and tallow proved to be the most effective lipid additive. Particularly preferred was a mixture of ¼ tallow and ¾ hydrogenated vegetable oil. The lipid component is added to the heated corn gluten meal/alcohol slurry in the present invention. Tallow has the added advantage of being a natural attractant for some birds. Specifically, tallow gives the product a suet note which is attractive to nuthatches and woodpeckers, such as Downy Woodpeckers and Redheaded Woodpeckers. Typically, these birds are not attracted to tube-type feeders dispensing either Niger/Thistle seeds or uncoated sunflower portions.

The product of this invention may be further improved by the inclusion in the top coat of agents which prevent the degradation of lipids. Specifically, such agents tend to prevent oxidative rancidity of the lipids in the top coat and the far more susceptible lipids within the sunflower chip or heart. Although many such agents are known in the food industry, citric acid, butylated hydroxyanisole (BHA) and butylated hydroxytoluene (BHT) are believed most suitable. In an especially preferred embodiment, all three agents are included in the top coat. It is desirable that glycerin be added to the gluten coating composition to counteract the tendency of native zein to gel.

Another feature of the present invention is a color coat on the sunflower seeds or hearts. A color coat may be used to simulate the color of Niger/Thistle seeds. Inedible colors are to be avoided because of the unknown health risks to birds as well as humans, especially small children, who might have an opportunity to ingest the product. Thus, in order to simulate the dark color of the exterior of Niger/Thistle seeds, edible food-grade brown and black colors are recognized as possibilities for coating. Such coatings may be soluble in water or solvents. The water soluble color coats are particularly preferred. The hydrophobic top serves in part to prevent the water soluble coat from attracting excess moisture. Additionally, the top coat protects the water soluble color coat from washing off.

Surprisingly, the ability to provide a dark colored coat upon the sunflower hearts or chips is not a sufficient predictor of success for components of the color coat. Specifically, two dark colorings were tested—liquid caramel color and reconstituted dry animal blood. Although both effectively provide a dark coat upon the sunflower hearts or chips, hearts coated with reconstituted dried animal blood were rejected by birds. In contrast, hearts and chips color coated with liquid caramel color were readily accepted by the birds.

An additional benefit provided by the subject invention is a nutritional superiority to Niger/Thistle seeds. In Table 1, the product of this invention is compared with Niger/Thistle seed. Additionally, Table 1 includes a column indicating the percentage increase over Niger/Thistle seeds represented by the subject invention.

TABLE 1

| Item (dry weight basis) | Wild Finch Feed of Present Invention | Niger/Thistle Seed | Percentage Increase Over Niger Thistle |
|---|---|---|---|
| Oil | 46.6% | 38.9% | +19.8% |
| Protein | 24.1% | 22.2% | +8.5% |
| Carbohydrates | 19.9% | 17.8% | +11.8% |
| Fiber | 3.8% | 14.4% | |
| Ash | 5.6% | 6.7% | |
| Energy Calories/gm | 557 | 459 | +21.4% |

Note that the higher lipid, protein and carbohydrate content of the product of this invention relative to Niger/Thistle seeds means that wild birds which consume this product receive more energy and nutrient value and less fiber and ash. This may explain their apparent preference for this invented seed product.

Although a number of methods may be used to prepare the product of the subject invention, in the preferred method the product can be advantageously prepared on a commercial basis by first using a batch fluid bed dryer to apply the coloring layer. Such dryers are designed to apply coatings to particulates using a two-fluid nozzle spray system. (One such machine is a Glatt WSG-120). If desired, the seeds are coated following application of the color with the hydrophobic coating containing the gluten granules in a batch or continuous enrober as described in FIG. 1. A batch system standard candy panner is also suitable to apply the hydrophobic coating. The seed, once coated, is in a free flowing particulate state, that is, the individual seed particles do not stick to each other. This characteristic is important since the coated seed is used in bird feeders which require that the seed flows freely.

An additional beneficial effect noticed in the fluidization process during application of the color is the ability of the process to remove lightweight residual hull material. This removal has the additional beneficial effect of increasing the nutritional quality of a per pound basis on the feed. The elimination of lightweight residual hull material also facilitates packaging on high speed, form-filled seal flexible packaging equipment.

Sunflower seed pieces can also be colored by blending dry water soluble color with the seed pieces and spraying with water in a revolving enrober, panner or fluidized bed. Following a drying step, the seeds are then coated with the gluten meal coating. An alternative procedure is to blend alcohol soluble color with the alcohol solution of corn gluten and other components to dissolve and spread the coloring over the surface of the seed. As the alcohol evaporates, the seed is coated with a dark, shiny coating.

The gluten coating material of the present invention is typically prepared as follows:

1. Denatured ethyl alcohol (SDA 35A or any suitable short chain alcohol such as ethanol or isopropanol) is diluted to 90% alcohol and then mixed with corn gluten meal in a weight ratio of 2:1 to 5:1 with the preferred ratio being 3.5:1.
2. The mixture is heated to a range of 80° F. to 130° F. and held at temperature for 5–60 minutes. Preferably, the mixture is heated to 110° F and held for 20 minutes.
3. To the above mixture are added rendered beef tallow and glycerin. The beef tallow should be 1–25% (preferably 15%) and the glycerin should be 2–10% (preferably 8%) of the total coating product after all components are added. Optionally, 0.1%–0.8% (preferably 0.28%) each BHT and BHA and 0.1%–0.8% (preferably 0.42%) of citric acid may be added to enhance the stability of the beef tallow.
4. The corn gluten meal coating contains an insoluble fraction equal to 60% of the original gluten meal weight. Surprisingly, the coating as prepared above can be readily applied to sunflower seed chips at a level of 1–2% dry solid coating without observing the insoluble particles in the final coated product. Bound to the seed by solubilized zein and overcoated with the zein/tallow layer—the residual gluten is not evident. The advantages of the invented process for coating preparation are as follows:
  1. There is no need to separate the residual insoluble gluten from the zein coating or to dispose of this by-product.
  2. The residual gluten is 29–35% protein and adds to the nutritional value of the seed product for bird feeding. It is readily accepted by birds.
  3. Cost of preparing the coating is reduced when compared to preparing this type of coating from a refined zein.
  4. Preparation of the coating is surprisingly simplified with no reduction in the quality of the coated seed over that of seed coated with a coating prepared from dried, refined zein dissolved in denatured alcohol.
  5. Inclusion of the tallow not only promotes the palatability of the seed for certain birds, but renders the seed non-tacky during the drying process so that it does not stick together, a major problem when using a shellac coating. It also improves the water resistance and counteracts caking of the coated seed.

The following examples are intended to be purely exemplary and not intended to limit the present invention in any way. All percentages are by weight, except where noted.

Example 1

Sunflower hearts were obtained from commercial shellers in the Red River Valley. These hearts were bi-products. Specifically, they were screenings from whole seeds that had been de-hulled and sifted. 300 pounds of seeds passing through an 8-mesh screen, but not a 20-mesh screen, were placed in a Glatt WSG-120 batch fluid bed drier. Warm air of 40° –100° C. was pulled through the chamber and the product to fluidize the hearts. During this process, a two-fluid nozzle apparatus was used to spray coat a carmel color solution on the sunflower hearts and chips. The color solution consisted of 7.6 pounds of carmel color (Sethness Products, Chicago, Ill., type DS 400, 51% dry solids) and 30 pounds of warm water. As the carmel color was applied at a rate of 500 grams/minute, the surface of the hearts became progressively darker. Between 3.3 and 7.7 pounds of carmel color was applied to 300 pounds of seeds. Following application of the carmel color, the sunflower hearts and chips were dried to a moisture content between 1–5%.

Following drying, the hydrophobic gluten top coating was applied to the colored sunflower hearts and chips using a cylindrical enrober 8 feet long and 2.5 feet in diameter. The composition of the hydrophobic top coating composition used in this example is given in Table 2.

TABLE 2

| Gluten Meal Tallow Composition | |
|---|---|
| 57.00% | Ethyl Alcohol SDA 35A |
| 3.00% | Water |
| 17.30% | Gluten Meal |
| 15.00% | Tallow |
| 7.00% | Glycerin |
| 0.28% | BHA |
| 0.28% | BHT |
| 0.42% | Citric Acid |

Six pounds of the top coat composition were applied at a rate of 400 grams/minute. In other tests, it was determined that an acceptable range is 3–20 pounds (wet) per 300 pounds of seed chips. This equates to 0.8 to 2.6 gallons of 37% dry solids composition of Table 2 on 300 pounds of colored hearts of size less than 8-mesh and greater than 20-mesh. As the solvent alcohol evaporated, a uniform, thin layer or coating of hydrophobic top coat was formed around the individual colored sunflower hearts and chips. The coating dries rapidly in 3–5 minutes.

Example 2

In a most preferred variation of Example 1, a charge of only 150 pounds of sunflower seeds were colored with carmel color. Following the carmel coloring step and drying to a moisture level of less than 5%, a second 150 pounds of uncolored sunflower hearts and chips were added to the colored hearts and chips in the batch fluid bed dryer and the hydrophobic top coat was applied as described in Example 1.

Feeding trials were performed to test both the stability and acceptance by wild birds of the product of Example 2. The tests involved side-by-side comparisons of the mixed color seeds of Example 2 against Niger/Thistle seeds. Clear transparent tube-type feeders were used as a delivery or supplying means in an outdoor environment. Such feeders are an effective way of attracting popular wild birds and excluding sparrows. In side-by-side tests, wild birds preferred the substitute feed of Example 2 over the Niger/Thistle seed. Specifically, the wild birds emptied the feeders with the invented product before the feeders containing Niger/Thistle seed. In most tests, the wild birds abandoned consumption of Niger/Thistle seed entirely, whenever the coated feed was available. Additionally, the new feed attracted both Downy and Redheaded Woodpeckers and Nuthatches all year.

The most dramatic demonstration of the superiority of the coated hearts or chips involved another test. In a variation of the side-by-side test, tube-type feeders were first half filled with Niger/Thistle seeds. Next, the top halves of the feeders were filled with the product of Example 2. These feeders included dispensing openings at several levels along the walls of the tubes. In an outdoor environment, wild birds selectively consumed the product of Example 2 from the upper dispensing openings and failed to consume the Niger/Thistle seed from the lower dispensing openings. The top halves of the feeders were refilled several times with the product of Example 2 to confirm the test.

Side-by-side tests were also performed comparing the product of Example 2 against sunflower seed portions lacking color and hydrophobic top coats. The coated product was preferred by the wild birds. Additionally, the uncoated sunflower portions were observed to spoil and/or develop insect infestation. The mechanism by which the coatings inhibit insect infestation is not yet fully understood. Although not considered limiting in this invention, a theoretical explanation may be that the top coating renders the sunflower chips unpalatable to insects.

Examples 3-6

The process described in Examples 1 and 2 was repeated, but alternative sources of lipids were employed in the top coat. The alternative lipids were carnuba wax, stearine, a high AOM stable triglyceride blend (Durkex 500), isolated mono- and di-glycerides, a blend of mono- and di-glycerides or combinations of these lipids with or without tallow. These alternative lipid sources resulted in acceptable bird feed; however, in the absence of tallow, they lacked the desirable property of attractiveness to woodpeckers.

Although the present invention has been described with reference to preferred embodiments, workers skilled in the art will recognize that changes may be made in form and detail without departing from the spirit and scope of the invention.

What is claimed is:

1. A method of feeding wild birds comprising:
   coating a sunflower seed portion of less than 4-mesh with a dark coloring substance and a top coat including as a primary ingredient corn gluten meal and tallow in an amount sufficient to form a hydrophobic top coat; and
   supplying the coated sunflower seed portion to wild birds.

2. The method of claim 1 wherein the coating further includes an antioxidant.

3. The method of claim 1 wherein the wild birds include nuthatches and woodpeckers.

4. A wild bird food consisting essentially of
   a sunflower seed portion of less than 4-mesh in size having a dark color coating and a top coating including as a primary ingredient corn gluten meal wherein the amount of the coating is sufficient to form a hydrophobic coating.

5. The food of claim 4 wherein the coating further includes an antioxidant.

6. A process for producing a wild bird food comprising:
   coating a sunflower seed portion of less than 4-mesh in size with a dark colored coating and a top coating having a primary ingredient of corn meal gluten and tallow such that in an amount sufficient for forming coated sunflower seed portions in a free flowing particulate state.

7. The process of claim 6 wherein the corn meal gluten is applied in an alcohol solution.

8. The process of claim 6 wherein the coating is applied in a fluidized air dryer.

9. The process of claim 6 wherein the coating is applied in a revolving enrober.

10. The process of claim 6 wherein the coating is applied in a panner.

* * * * *

UNITED STATES PATENT AND TRADEMARK OFFICE
CERTIFICATE OF CORRECTION

PATENT NO. : 4,942,043

DATED : July 17, 1990

INVENTOR(S) : Eugene H. Sander

Page 1 of 2

It is certified that error appears in the above-identified patent and that said Letters Patent is hereby corrected as shown below:

On the title page:

In the References Cited Section, under U.S. PATENT DOCUMENTS, add the following:

| | | | |
|---|---|---|---|
| 2,791,509 | 5/1957 | Cosler | 99/166 |
| 3.032,422 | 5/1962 | Alikonis | 99/166 |
| 3,062,660 | 11/1962 | Alikonis et al | 99/126 |
| 3,080,285 | 3/1963 | Odenwald et al | 167/53.1 |
| 3,136,640 | 6/1964 | Rabinovitch | .99/4 |
| 3,615,653 | 10/1971 | Fults | .99/8 |
| 3,872,229 | 3/1975 | Durst et al. | 426/62 |
| 4,007,284 | 2/1977 | Goryaev et al. | 426/98 |
| 4,104,987 | 8/1978 | Winston | 119/51 |
| 4,153,733 | 5,1979 | Pierce | 426/72 |
| 4,246,869 | 1/1981 | Tobin, Jr. | 119/51 |
| 4,368,591 | 1/1983 | Barke et al. | 47/57.6 |
| 4,394,845 | 7/1983 | Porter et al | 118/303 |
| 4,436,757 | 3/1984 | Lange et al. | 426/438 |
| 4,522,833 | 6/1985 | Sharma | 426/93 |
| 4,597,973 | 7/1986 | Moore | 426/93 |
| 4,735,015 | 4/1988 | Schmolka | 47/57.6 |
| 4,765,996 | 8/1988 | Misaki et al | 426/72 |

Col. 8, line 14, delete "essentially of", insert --essentially of:--

Col. 8, line 17, after "meal", insert --and tallow--

UNITED STATES PATENT AND TRADEMARK OFFICE
CERTIFICATE OF CORRECTION

PATENT NO. : 4,942,043

DATED : July 17, 1990

INVENTOR(S) : Eugene H. Sander

It is certified that error appears in the above-identified patent and that said Letters Patent is hereby corrected as shown below:

Col. 8, line 27, after "tallow", delete "such that"

Signed and Sealed this

Third Day of December, 1991

Attest:

HARRY F. MANBECK, JR.

*Attesting Officer*        *Commissioner of Patents and Trademarks*